United States Patent
Zeng (10) Patent No.: US 7,609,766 B2
(45) Date of Patent: Oct. 27, 2009

(54) SYSTEM OF INTRA-PICTURE COMPLEXITY PREPROCESSING

(75) Inventor: Steve Zhihua Zeng, Newmarket (CA)

(73) Assignee: VIXS Systems, Inc., Toronto (CA)

( * ) Notice: Subject to any disclaimer, the term of this patent is extended or adjusted under 35 U.S.C. 154(b) by 998 days.

(21) Appl. No.: 11/053,586

(22) Filed: Feb. 8, 2005

(65) Prior Publication Data

US 2006/0176952 A1    Aug. 10, 2006

(51) Int. Cl.
    *H04N 7/12*      (2006.01)
(52) U.S. Cl. .................. 375/240.2; 375/240.26
(58) Field of Classification Search .............. 375/240.2, 375/240.05, 240.24, 240.26; 348/467
See application file for complete search history.

(56) References Cited

U.S. PATENT DOCUMENTS

| | | | |
|---|---|---|---|
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,253,056 A | 10/1993 | Puri | |
| 5,475,434 A | 12/1995 | Kim | |
| 5,526,054 A * | 6/1996 | Greenfield et al. | 348/467 |
| 5,563,950 A | 10/1996 | Easter et al. | |
| 5,602,589 A | 2/1997 | Vishwanath et al. | |
| 5,610,659 A * | 3/1997 | Maturi et al. | 375/240.24 |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A * | 4/1998 | Hall et al. | 375/240.2 |
| 5,740,028 A | 4/1998 | Sugiyama et al. | |
| 5,844,545 A | 12/1998 | Suzuki et al. | |
| 5,850,443 A | 12/1998 | Van Oorschot et al. | |
| 5,940,130 A | 8/1999 | Nilsson et al. | |
| 5,996,029 A | 11/1999 | Sugiyama et al. | |
| 6,005,623 A | 12/1999 | Takahashi et al. | |
| 6,005,624 A | 12/1999 | Vainsencher | |
| 6,014,694 A | 1/2000 | Aharoni et al. | |
| 6,040,863 A | 3/2000 | Kato | |
| 6,081,295 A | 6/2000 | Adolph et al. | |
| 6,141,693 A | 10/2000 | Perlman et al. | |
| 6,144,402 A | 11/2000 | Norsworthy et al. | |
| 6,167,084 A | 12/2000 | Wang et al. | |
| 6,182,203 B1 | 1/2001 | Simar, Jr. et al. | |

(Continued)

FOREIGN PATENT DOCUMENTS

EP      0661826 A2      7/1995

(Continued)

OTHER PUBLICATIONS

Huifand Sun et al.; "MPEG Coding Performance Improvement by Jointly Optimizing Coding Mode Decisions and Rate Control"; IEEE Transactions on Circuits and Systems for Video Technology, IEEE Service Center; Jun. 1997; vol. 7, No. 3; Piscataway, NJ, US.

(Continued)

*Primary Examiner*—Gims S Philippe (57) ABSTRACT

A system having a video pipeline that includes a variation calculation portion is disclosed. The variance calculation portion calculates a plurality of variance values for a macroblock. A DCT-type indicator for the macroblock is determined based upon the plurality of variance values.

24 Claims, 8 Drawing Sheets

U.S. PATENT DOCUMENTS

| | | | |
|---|---|---|---|
| 6,215,821 | B1 | 4/2001 | Chen |
| 6,219,358 | B1 | 4/2001 | Pinder et al. |
| 6,222,886 | B1 | 4/2001 | Yogeshwar |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,438,168 | B2 | 8/2002 | Arye |
| 6,480,541 | B1 | 11/2002 | Girod et al. |
| 6,507,673 | B1 | 1/2003 | Wang et al. |
| 6,526,099 | B1 | 2/2003 | Chistopoulos et al. |
| 6,529,634 | B1 | 3/2003 | Thyagarajan et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 6,847,684 | B1 | 1/2005 | Hsu |
| 7,092,442 | B2 * | 8/2006 | Zhang et al. ........... 375/240.05 |
| 7,366,240 | B2 * | 4/2008 | Chiang Wei Yin et al. ............. 375/240.26 |
| 2001/0026591 | A1 | 10/2001 | Keren et al. |
| 2002/0085633 | A1 | 7/2002 | Kim et al. |
| 2002/0106022 | A1 | 8/2002 | Satoh et al. |
| 2002/0110193 | A1 | 8/2002 | Kyoon et al. |
| 2002/0138259 | A1 | 9/2002 | Kawahara |
| 2002/0145931 | A1 | 10/2002 | Pitts |
| 2002/0196851 | A1 | 12/2002 | Lecoutre |
| 2003/0093661 | A1 | 5/2003 | Loh et al. |
| 2003/0152148 | A1 | 8/2003 | Laksono |
| 2004/0013198 | A1 | 1/2004 | Togashi |
| 2004/0122398 | A1 | 6/2004 | Schnabel et al. |
| 2005/0074062 | A1 | 4/2005 | Sung et al. |

FOREIGN PATENT DOCUMENTS

| | | |
|---|---|---|
| EP | 0739138 A2 | 10/1996 |
| EP | 0782344 A2 | 7/1997 |
| EP | 0784407 | 7/1997 |
| EP | 0805599 A2 | 11/1997 |
| EP | 0 784 407 A3 | 1/1998 |
| EP | 0855805 A2 | 7/1998 |
| EP | 0896300 B1 | 2/1999 |
| EP | 0901285 A1 | 2/1999 |
| EP | 0917362 A | 5/1999 |
| EP | 0926899 | 6/1999 |
| EP | 0955607 A2 | 11/1999 |
| EP | 1032214 A2 | 8/2000 |
| EP | 1087625 A2 | 3/2001 |
| EP | 1365596 A2 | 11/2003 |
| EP | 1596603 | 11/2005 |
| GB | 2425430 A | 10/2006 |
| JP | 07-210670 A | 8/1995 |
| WO | WO 01/95633 A2 | 12/2001 |
| WO | WO 02/080518 A2 | 10/2002 |

OTHER PUBLICATIONS

Yanmei Qu et al.; "A Fast MBAFF Mode Protection Strategy for H.264/AVC"; Signal Processing; 7th International Conference on Beijing, China, Aug. 31-Sep. 4, 2004; Piscataway, NJ, US; Aug. 31, 2004; pp. 1195-1198.

Translation of German Examination Report for German Application No. 102006008780, 8 pages.

French Examination Report for French Application No. FR0601605, 8 pages (No Translation Available).

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "Qos Provisioning for Video Streaming Over IEEE 802.11 Wireless LAN," (abridged) IEEE Conferences in Consumer Electronics, Jun. 16, 2003, EE Times, Seoul, Korea, <http://eetimes.com/printableArticle?doc_id=OEG20030611S0070> retrieved Jul. 8, 2003.

Youn, Jeongnam et al., "Video Transcoding for Multiple Clients," Proceedings of the SPIE, Bellingham, VA, vol. 4067, XP008012075, pp. 76-85, University of Washington, Sealttle, WA.

Lengwehasatit, Krisda et al.. "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huffman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090, 2000 IEEE pp. 204-209, AT&T Labs, Menlo Park, California.

Bouras, C. et al. "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct 2000, pp. 407-414, XP004419498 ISSN: 1077-2014, Taejon, Korea.

Lee, Liang-Wei et al., "Dynamic Search-Window Adjustment and Interlaced Search for Block-Matching Algorithm," IEEE Transactions On Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, Calfiornia.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decoder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk/satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5-GHz OFDM Modem Solution," Sep. 2001, pp. 1-6, IceFyre: Rethink Wireless, IceFyre Semiconductor, Inc.

Pozar, David M., "Theory and Design of Ferrimagnetic Components," 1990, pp. 529, Microwave Engineering, Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

* cited by examiner

SYSTEM OF INTRA-PICTURE COMPLEXITY PREPROCESSING

FIELD OF THE DISCLOSURE

The present disclosure relates generally to video processing and more specifically to processing a variance for video pictures.

DESCRIPTION OF THE RELATED ART

Video processing techniques operate on a sequence of individual pictures that represent moving video when displayed sequentially. It is often desirable for raw pictures to be compressed to reduce the quantity of data needed to represent the sequence of individual pictures making up the video. A common compression technique is to remove spatial redundancy from source pictures using a block-based DCT (Discrete Cosine Transform) method. The block-based DCT method can compress either picture frame data or picture field data in an attempt to optimize compression of the source pictures. Therefore, a system and method for improving optimization of source pictures would be useful.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENTS

A system and method of determining and storing a DCT-type indicator is disclosed. Specifically, a plurality of variances are determined for a macroblock and used to determine whether frame or field compression of the macroblock should be implemented. The present disclosure is better understood with reference to FIGS. 1-7, FIG. 1 illustrates a system 100 in accordance with a specific embodiment of the present disclosure. System 100 represents a video processing system having a plurality of modules including Video Input 110, Video Pipeline 120, Video Compressor 130, Memory Controller 140, Controller 150, and Memory 160.

The term "port" herein is used broadly to refer to functionally related connections of a system or a portion of a system. For example, the term port can refer to one or more input connections, one or more output connections, and one or more bi-directional connections as related to a specific portion of a system. It will be appreciated that specific port types between components in the FIGs. are illustrative, and not necessarily meant to limit connections to a specific port type, or to imply the existence of separate ports. For example, a specific module illustrated as having an input port, represented by an "in" arrow, and an output port, represented by an "out" arrow, may in an actual implementation have a single bi-directional port.

Figure 1:
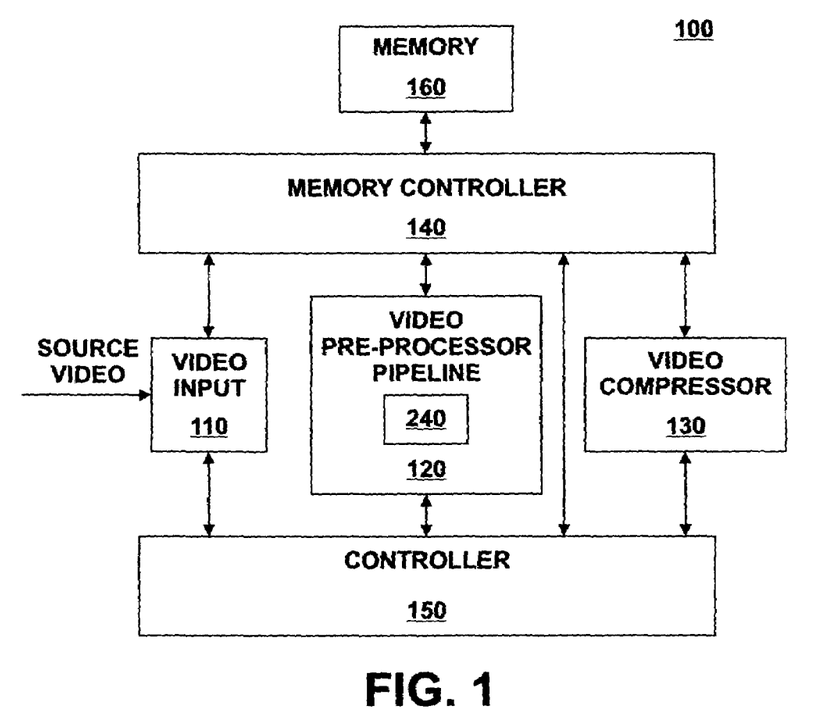
FIG. 1 is a block diagram representing a system in accordance with the present disclosure.

The Video Input 110 has a port to receive video data SOURCE VIDEO, and is connected to Memory Controller Variation Calculator 140 and Controller 150. Video Pipeline 120 is connected to Memory Controller 140 and Controller 150. Video Compressor 130 is connected to Memory Controller 140 and Controller 150. Memory Controller 140 is additionally connected to Controller 150 and Memory 160.

In operation, SOURCE VIDEO representing a plurality of raw pictures of a video stream is received at Video Input 110. The raw pictures are provided to the Video Pipeline 120, which prepares the pictures for video compression. A specific module 240 of Video Pipeline 120 is illustrated and represents a pipeline stage module used to determine variations within the pictures. Video Compressor 130 receives and compresses the preprocessed pictures from Video Pipeline 120 based on the variation information from the Variation Calculator 240. In the embodiment illustrated, data is transferred between the modules 110, 120, and 130 through Memory Controller 140 resulting in a latency period from when data is requested from Memory 160 to when it is available at the modules.

Processing efficiency is realized by calculating picture variation information within Video Pipeline 120 because a single access to memory 160 can be used to support multiple pre-compression stages within the Video Pipeline 120, including the Variation Calculator 240 stage. The ability to use a single access as described herein reduces the data bandwidth requirements between Memory Controller 140 and Memory 160, and between Memory Controller 140 and its clients. A specific implementation of Video Pipeline 120 is illustrated in FIG. 2.

Figure 2:
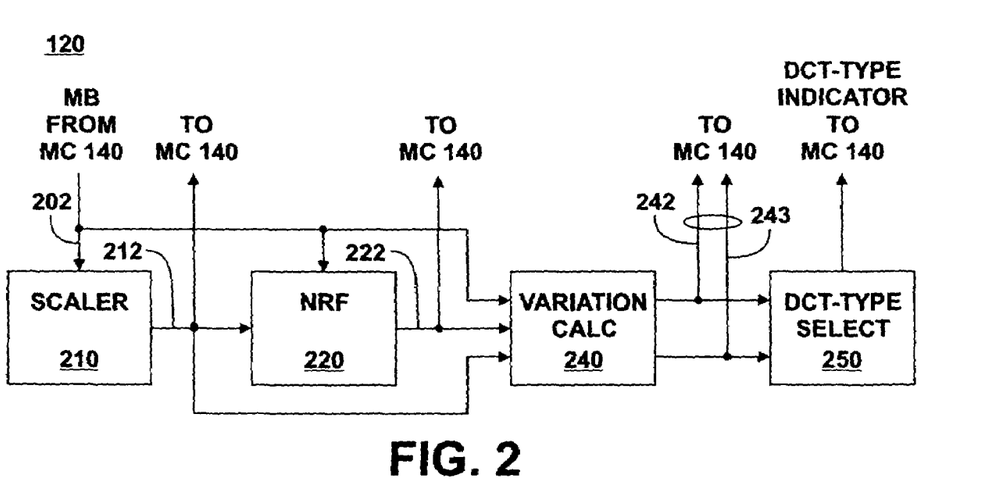
FIGS. 2 and 4 are specific embodiments of a pipeline in accordance with a specific embodiment of the present disclosure.

FIG. 2 illustrates a specific embodiment of Video Pipeline 120 including Scaler 210, Noise Reduction Filter 220, Variation Calculator 240, and DCT-Type Selector 250. One or more connections, such as connections represented by 202, 212, 222, 242, and 243, can be used to implement one or more data flow options through Video Pipeline 120. For example, all data may flow sequentially from Scaler 210 to Noise Reduction Filter 220 to Variation Calculator 240 to DCT-Type Selector 250. In another embodiment, the data may selectively, such as through the use of a register (not shown), bypass one or both of Scaler 210 and Noise Reduction Filter 220, as represented by Connection 202.

In operation, source video pictures are received at Video Pipeline 120 of FIG. 2 from Memory 160. Typically, the source pictures are received at, and operated on by, Video Pipeline 120 as sets of data representing only a portion of a source picture. For example, the portion may be a specific block of the source picture. In one embodiment, the specific block may be one or more macroblocks. Note, the term macroblock, as used herein, is used in a specific context as understood with respect to one or more MPEG Specifications, such as currently available versions of the various MPEG standards referred to as MPEG1, MPEG2 and MPEG4, all of which are readily known to those skilled in the art. However, it is to be understood that use of specific contexts in the disclosure herein are for purposes of illustration and extend other block-based contexts of processing video information.

The destination of the source picture information within Video Pipeline 120 can be one or more stages including Scaler 210, Noise Reduction Filter 220, and Variation Calculator 240 as indicated by Connection 202. The destination of the source video pictures in Video Pipeline 120 can be fixed or variable by design. For example, System 100 can be designed to exclusively provide source picture data to Scaler 210. Alternatively, System 100 can provide for registers (not illustrated) that allow for the source data to be provided to one or more of several stages of Video Pipeline 120. For example, the source data could be provided to one of Scaler 210, Noise Reduction Filter 220, and Variation Calculator 240 based upon a value stored at a register location.

As illustrated, Scaler 210 can receive raw source picture data, such as macroblocks from Memory 160 labeled MB from MC 140. Scaler 210 is a video scaler capable of scaling the source pictures in one or both of a vertical and horizontal dimension. Scaled pictures from Scaler 210, which are representations of the source pictures, can be provided to one or more stages of Video Pipeline 120 and Memory 160 through Memory Controller 140. Whether the scaled pictures from Scaler 210 are provided to Memory 160 and a Video Pipeline 120 stage, such as Noise Reduction Filter 220, and Variation Calculator 240, can be either fixed or variable by design.

For example, System 100 can be designed to always provide the scaled picture data to one or more destinations. For example, the scaled picture data could always be provided to Noise Reduction Filter 220, or always provided to Noise Reduction Filter 220 and Memory 160. In another embodiment, System 100 can provide for registers (not illustrated) that allow for the scaled data to be provided to one or more of several stages of Video Pipeline 120. For example, the scaled data could be provided to one of Noise Reduction Filter 220, and Variation Calculator 240 based upon a register value, and provided to Memory 160 based upon a different register value.

Noise Reduction Filter 220 receives picture data, such as macroblocks labeled MB from Memory 160 or scaled data from Scaler 210. Noise Reduction Filter Noise 220 filters received picture data and provides filtered picture data at Connection 222. Filtered picture data from Noise Reduction Filter 220 can be provided to one or more stages of Video Pipeline 120 (ability to provide filtered data to more than one stage not specifically shown), and Memory 160. Whether the filtered pictures from Noise Reduction Filter 220 are provided to one or more of Memory 160 and a Video Pipeline 120 stage, such as Variation Calculator 240, can be either fixed or variable by design, in a manner similar to that discussed with respect to Scaler 210 or Noise Reduction Filter 220.

Variation Calculator 240 receives picture data, such as macroblocks labeled MB from Memory 160, scaled data from Scaler 210, or filtered data from Noise Reduction Filter Noise Reduction Filter 220 and determines variation information for the received picture data. In one embodiment, the variation information is calculated for 8×8 blocks of luminance data. However, for purposes of efficiency, the calculation can be performed on a macroblock basis.

Figure 3A:
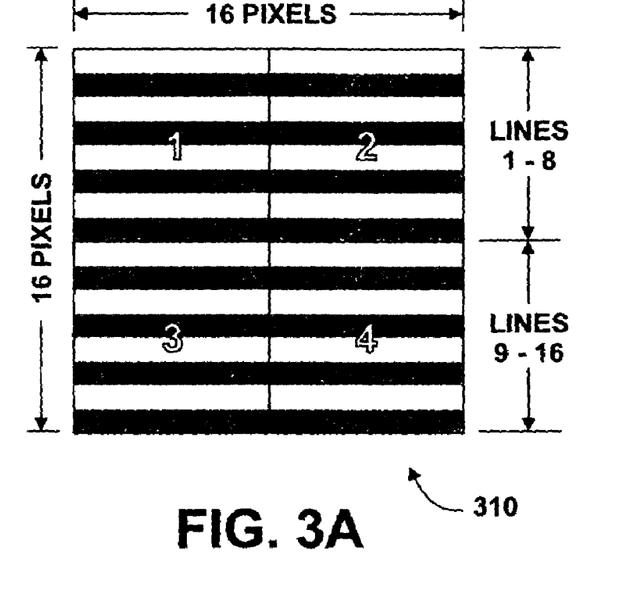
FIG. 3 illustrates eight blocks associated with a macroblock in accordance with a specific embodiment of the disclosure.

A 16×16 macroblock contains four field blocks and four frame blocks. FIG. 3 illustrates the four frame blocks and four field blocks for a macroblock 310. Frame block 1 comprises the top-most and left-most 64 pixels of macroblock 310. Frame block 2 comprises the top-most and right-most 64 pixels of macroblock 310. Frame block 3 comprises the bottom-most and left-most 64 pixels of macroblock 310.

Figure 3B:
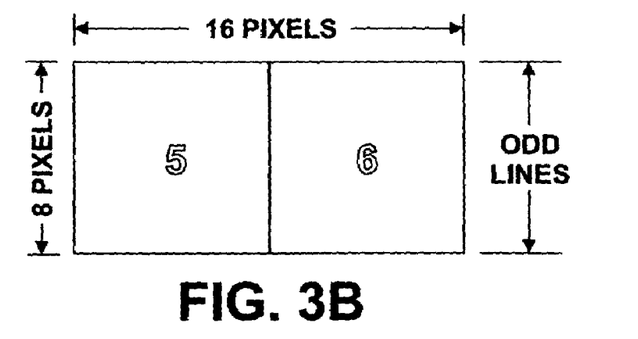
Figure 3C:
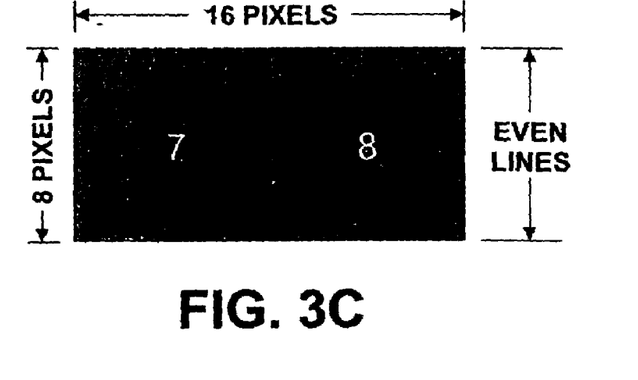

Frame block 4 comprises the bottom-most and right-most 64 pixels of macroblock 310. Top field blocks 5 and 6 are illustrated in FIG. 3B, where field blocks 5 and 6 comprise the top fields (the unshaded pixel lines of FIG. 3A) of the left and right halves of macroblock 310, respectively. Bottom field blocks 7 and 8 are illustrated in FIG. 3C, where field blocks 7 and 8 comprise the bottom fields (the shaded pixel lines of FIG. 3A) of the left and right halves of macroblock 310, respectively. One or more of these eight variance calculations can be provided to Memory 160 for later use as illustrated by Connection 243 and Connection 242. In accordance with a specific embodiment of the present disclosure, values representing variation information for each of the eight blocks are calculated.

DCT-Type Selector 250 determines a DCT-Type for each macroblock based upon the variation information calculated at Variation Calculator 240. In one embodiment, DCT-Type Selector 250 provides a Frame DCT indicator for a macroblock when a summation of the frame variations for the macroblock is less than a summation of the macroblock's field variances. Similarly, DCT-Type Selector 250 provides a Field DCT indicator for a macroblock when a summation of the field variances for the macroblock is less than a summation of the macroblock's frame variances. By selecting a DCT-Type for a macroblock based on the lowest total frame or field variance, and compressing the macroblock at Video Compressor 130 based upon the calculated DCT-Type, it has been demonstrated that improved overall compression is obtained.

Figure 4:
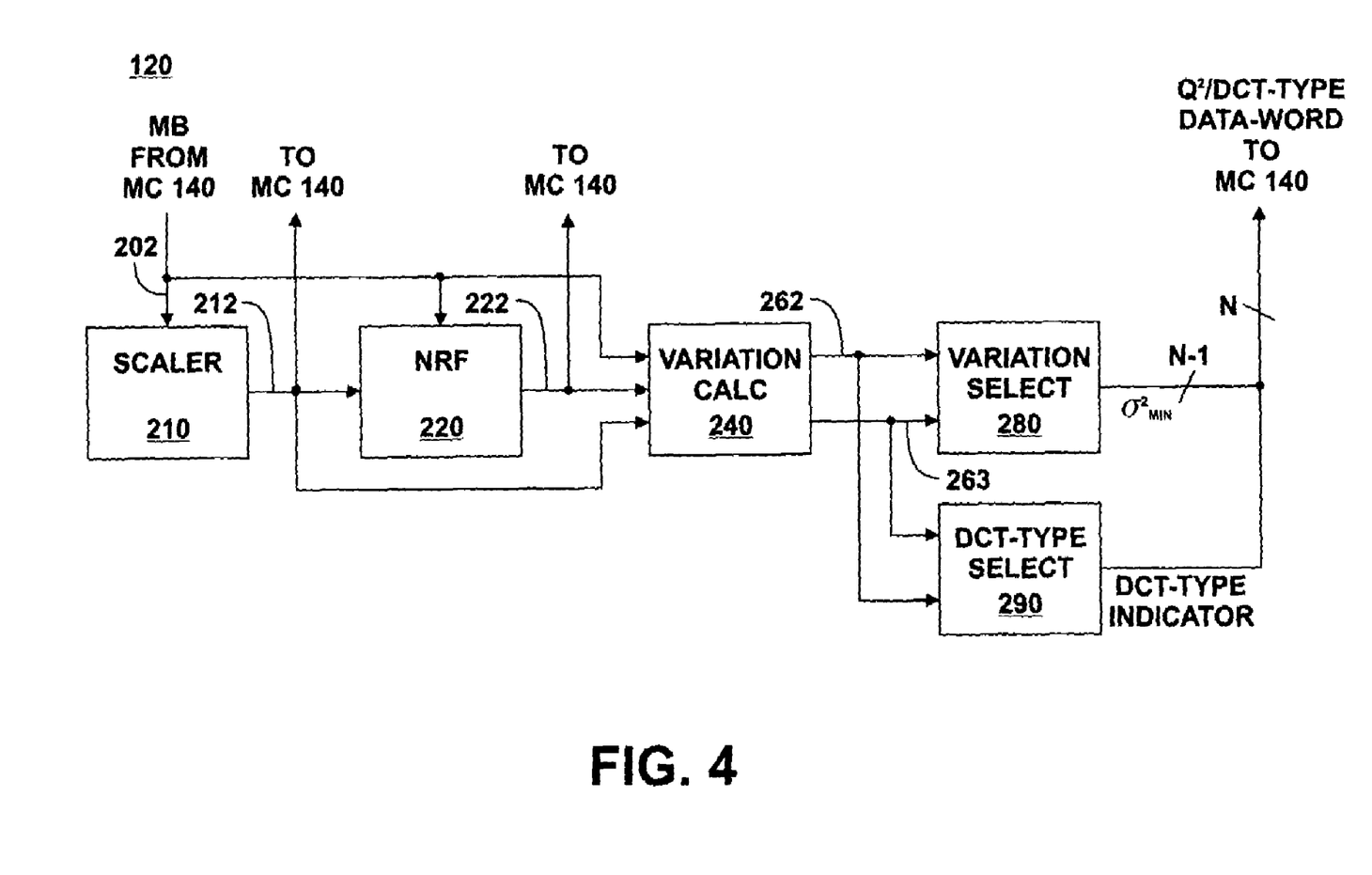

FIG. 4 illustrates an alternate embodiment of Video Pipeline 120. Elements analogous to those element previously described are similarly numbered. In the embodiment of FIG. 4, the eight block variation values calculated at Variation Calculator 240 for each macroblock are provided to Variance Select 280 and DCT-Type Select 290.

Variance Select 280 selects the smallest variance of the eight block variation values and provides that value, or a truncated or rounded representation of that value to the output of Variance Select 280. In one embodiment, the variations calculated by Variation Calculator 240 are 16-bit values and the variation values output by Variance Select 280 is a 15-bit value.

DCT-Type Select 290 determines a 1-bit DCT-type indicator based upon the plurality of variances in a manner similar to that previously described.

In the illustrated embodiment of FIG. 4, the 1-bit DCT-Type indicator is combined with the variation value, illustrated to be a 15-bit variance ($\sigma^2$), to form a data word that can be stored at Memory 160. In this manner, both variation and DCT-Type data can be stored in a single write, thereby requiring less bandwidth than if the DCT-type data and variance data were stored separately.

The variations calculated by Variation Calculator 240 measure spatial activity for a macroblock. The spatial activity ($act_j$), such as variation, of a macroblock j is calculated from the four luminance, frame-organized blocks, 1-4 of FIG. 3, and the four luminance, field-organized blocks, 5-8 of FIG. 3 as indicated in Eqn. 1. Note, if the macroblock is part of a progressive picture, the field variation may be omitted.

$$act_j = 1 + \min(vblk_1, vblk_2, \ldots, vblk_8) \qquad \text{Eqn. 1}$$

Where $vblk_1$-$vblk_8$ are the variations of the eight blocks of macroblock j. In the specific embodiment, the variation $vblk_1$-$vblk_8$ are variances determined by Eqn. 2:

$$vblk_n = \frac{1}{64} \times \sum_{k=1}^{64} (P_k^n - Pmean_n)^2 \qquad \text{Eqn. 2}$$

Where n represents one of the eight blocks, k represents one of the 64 pixels of the block n, $P_k$ represents the value of the kth pixel, and $Pmean_n$ is the mean value of the 64 pixels of the block n.

In one embodiment the variation is calculated on 8×8 blocks of luminance data on a macroblock basis. A 16×16 macroblock should contain four variation values, and for field variation values. In another embodiment, another two for the the smallest variations amongst the eight variations is selected to be the variance of the MB, though other methods can be used to determine the variance of the MB. The resulting variation is written to into memory as part of a 16-bit (15-bit variance and a 1-bit DCT) value for a given macroblock j.

If vertical scaling is performed on the frame then there will only be four variance calculations instead of eight. This decrease in the number of variances results from dropping either the top or bottom field when performing vertical scaling. However, in a specific embodiment of System 100, there are still four variance values because the variance is calculated over an entire 16×16 macroblock. This results in sixteen even field lines (2, 4, 6, . . . , 32), or sixteen odd field lines (1, 3, 5, . . . , 31).

In one embodiment, all of the chosen variances are accumulated for an entire picture, and then normalized as part of the rate control algorithm. This normalization is performed at the end of a frame by dividing the sum of variances by the total number of macroblocks in that frame.

In one embodiment, the calculated variation for a block is its variance. The variance algorithm used can be simplified and reduced as follows. To begin, the variance calculation is only calculated on the 8-bit Y component outputs, such as on the output from the NRF. Variance ($\sigma^2$) is determined by performing the following accumulations on the 64 components of an 8×8 block:

1. Initialize s=s2=0;
2. For each Y component (64 total):

Let $v=Y_{CURRENT}$;

$s=s+v$;

$s2=s2+v*v$;

3. After receiving all 64 components:

$\sigma^2=s2-(s*s)/64$

Figure 5:
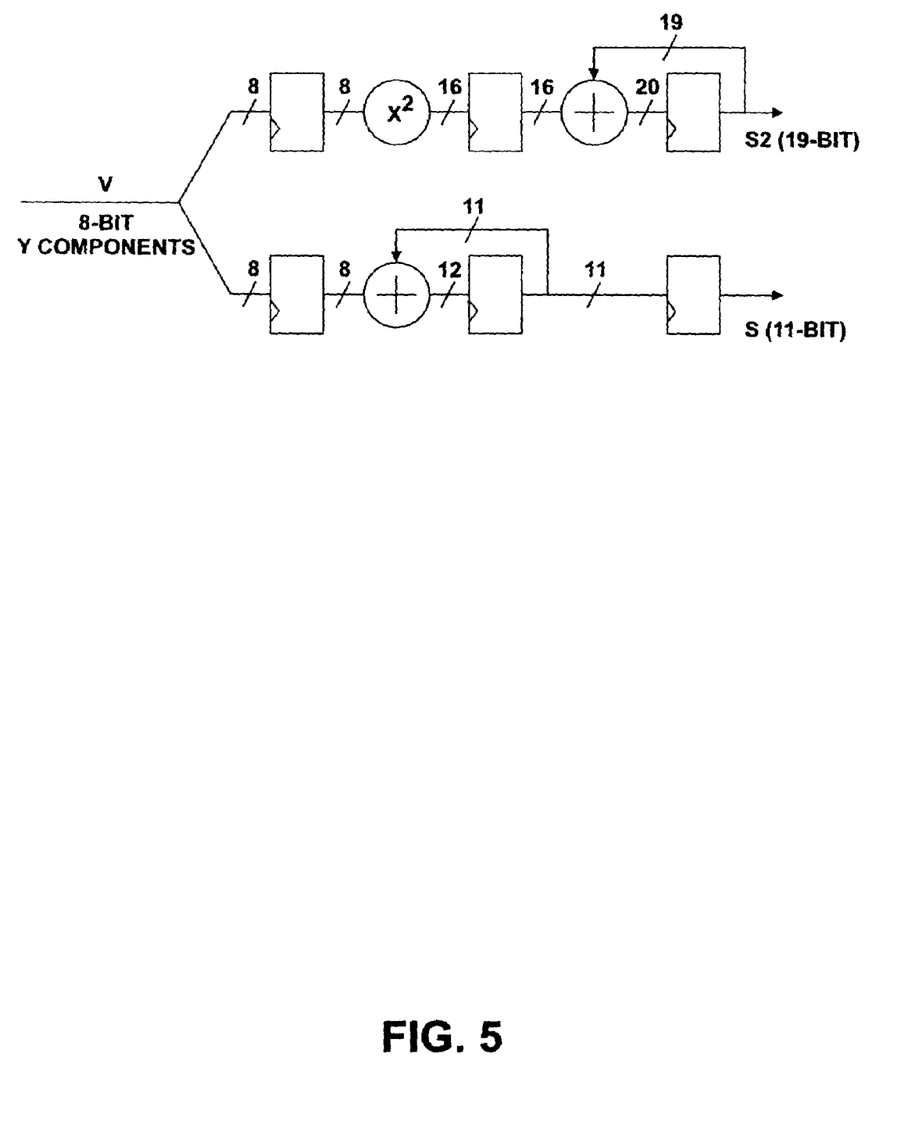
FIGS. 5 and 6 illustrate in block diagram form a specific implementation of a variation calculator module of the pipeline of FIGS. 2 and 4 in accordance with a specific embodiment of the disclosure.

FIG. 5 illustrates a specific integrated circuit implantation for determining s and s2. Specifically, each input, Y (luminance) component, to the variation block is operated on in the same fashion. Therefore to reduce area of the integrated circuit, the same block is used to calculate s and s2 for each luminance component. This calculation is performed on a single line of eight pixels, and each pixel is an 8-bit unsigned value that is input from the NRF or VS. Each of the illustrated accumulator portions is reset after receiving a set of eight pixels (½ of a macroblock line). Once the two intermediate variables, s and s2, are calculated they are then passed on to the variation variable accumulation block of FIG. 6.

Figure 6A:
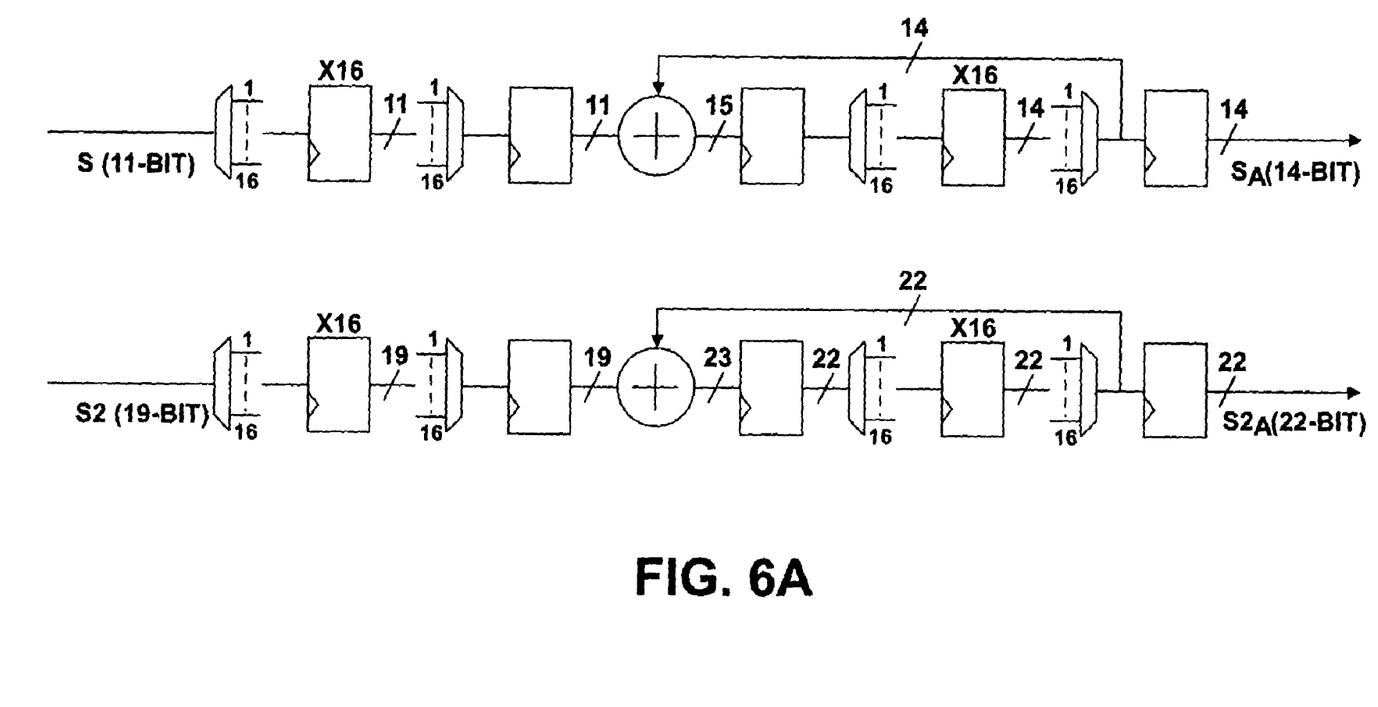
Figure 6B:
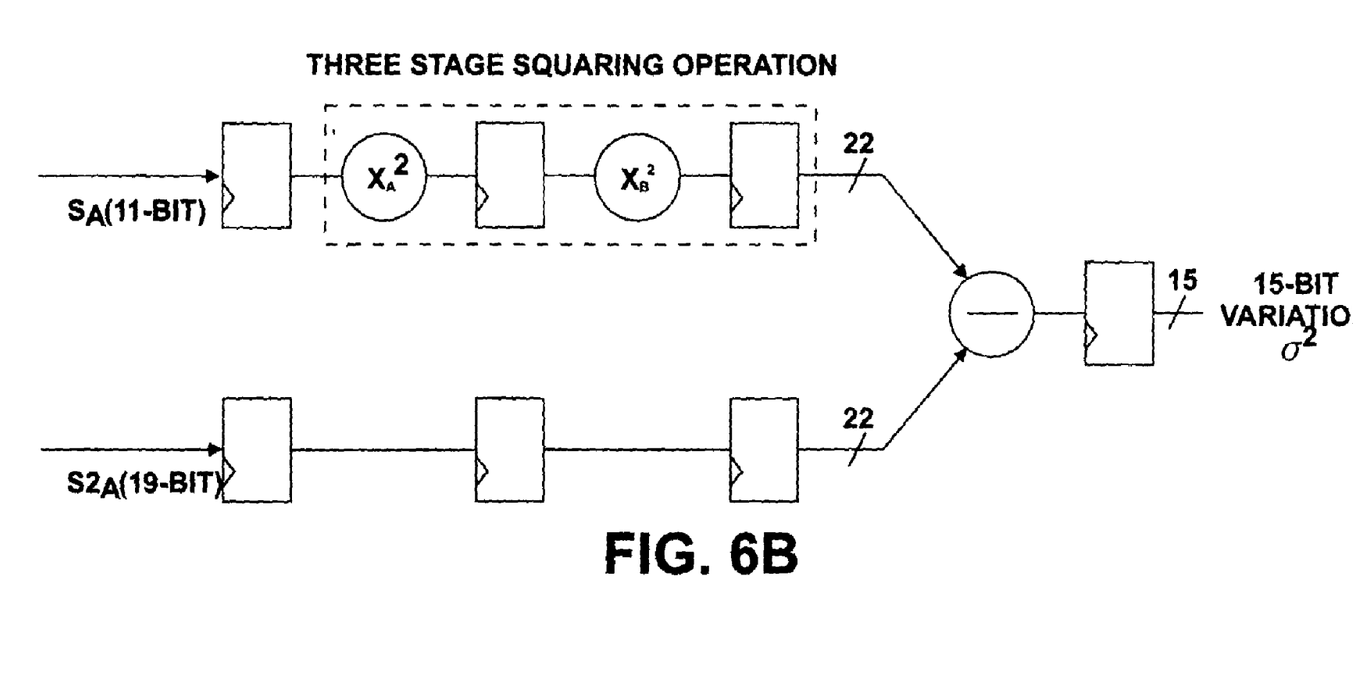

The variable accumulation block of FIG. 6 accumulates eight sets of s and s2 variables, which are used to calculate the variance ($\sigma^2$) of each of the luminance blocks by applying the equation of Step 3 above.

In order to reduce the area of the integrated circuit, the arithmetic functions of the variable accumulation block are shared between the eight luminance blocks. The specific implementation illustrated has an arithmetic datapath that is instantiated twice to account for the fact that each half of a MB line could be required for two variance field calculations. Hence for any given half of a MB line, there are two accumulations for the set of s and s2 variables.

In one embodiment of System 100, Noise Reduction Filter 220 or Scaler 210 processes a total of 64 pixels. These 64 pixels do not represent pixels from one single macroblock. Instead, they correspond to a line of pixels that spans four horizontally adjacent macroblocks. Consequently within each of the two accumulation paths of FIG. 6, there are MUX sections containing a maximum of sixteen accumulation registers for accumulating the s and s2 variables of the four possible MBs.

The variance is calculated using the final s and s2 variable values for a given 8×8 block of data. Therefore, two identical instantiations of the circuit of FIG. 6 can be used to generate all of the eight possible variances. The final variance value is truncated to a 15-bit result instead of the true 16-bit result expected by software. This bit reduction is necessary to facilitate writing of the concatenated variance information data block, which consists of the final MB variance and the DCT type.

In one embodiment, the Variation Calculator 240 is also responsible for determining the average frame variance. This average variance is simply the summation of all of the MB variances for the frame divided by the number of MBs in the frame.

However, a division by a non-constant divisor in hardware is not a trivial implementation. Therefore, software provides a normalization multiplication factor of 1/n in order to facilitate the implementation of the average variance calculation.

Figure 7:
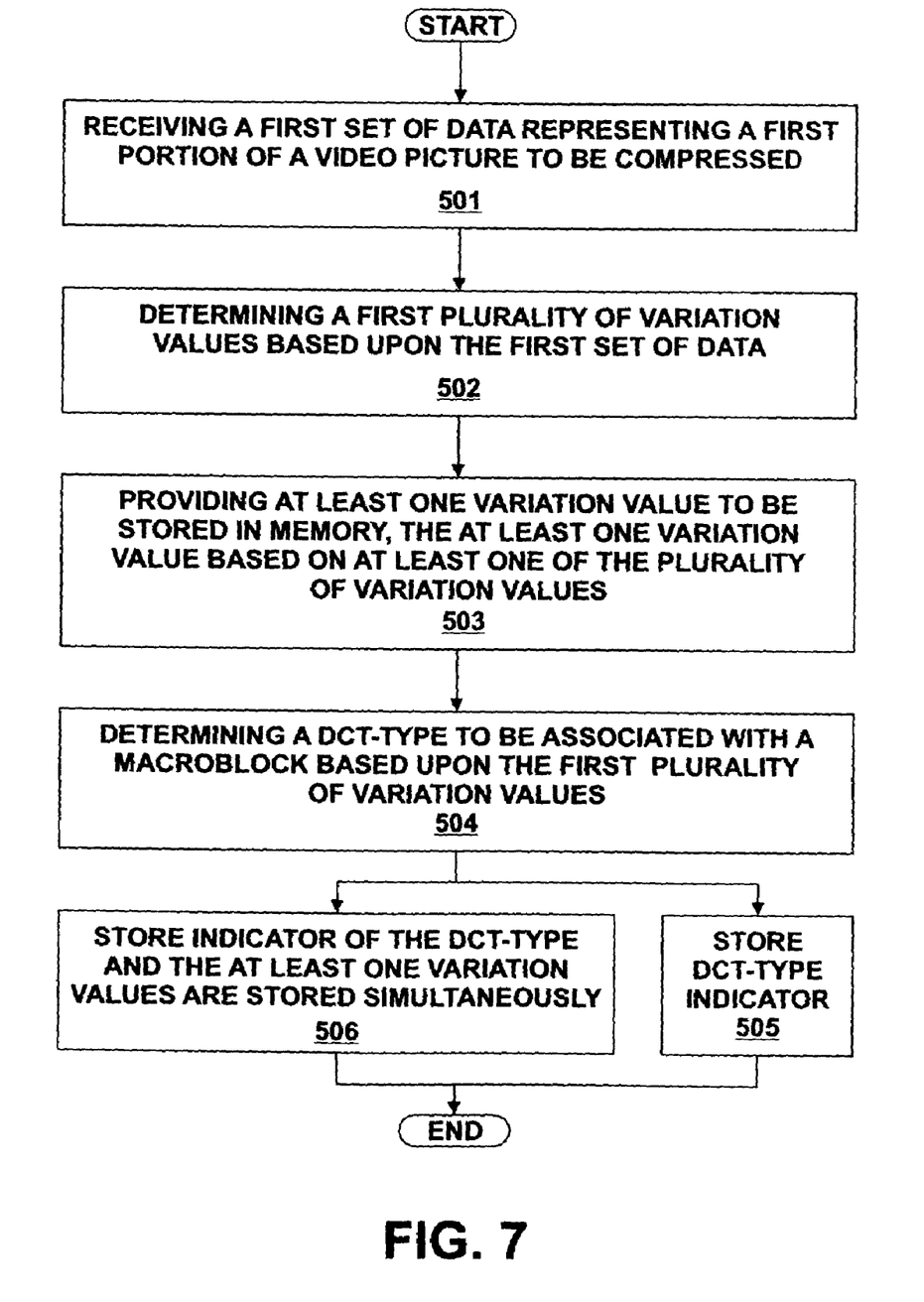
FIGS. 7 and 8 illustrate methods in accordance with a specific embodiment of the disclosure.

FIG. 7 illustrates a method in accordance with a specific embodiment of the present disclosures. At step 501, a first set of data representing a first portion of a video picture to be compressed is received. With respect to FIG. 2, the first set of data can be one or more macroblocks received at Variation Calculator 240. The first data set can be received from one of a plurality of pipeline stages based upon a user selection.

At step 502, a first plurality of variance values based upon the first set of data is determined. For example, eight variance values, one for each frame and field luminance block, can be determined.

One or more variance values calculated at 502 can be provided for storage in memory at step 503. Execution of 502, which stores can be conditional based upon a user selection. Data path 520 indicates that step 504 can be performed independent of step 503.

At step 504, a DCT-Type, which controls a compression of the first set of data, is determined based upon the first plurality of variance values. For example, the DCT-Type will be set to be a Field DCT when the Field variances have a lower sum than the Frame variances. Similarly, the DCT-Type will be set to be a Frame DCT when the Frame variances have a lower sum than the Field variances.

Steps 505 and 506 can be executed selectively and independent of each other. At step 506, an indicator of the DCT-type and an least one variance value is provided to memory simultaneously as part of a common data write.

At step 505 the DCT-type indicator is stored to memory. Video Compressor 130 uses the DCT-type indicator to control whether the macroblock associated with the DCT-type is compressed as frame or field data.

Figure 8:
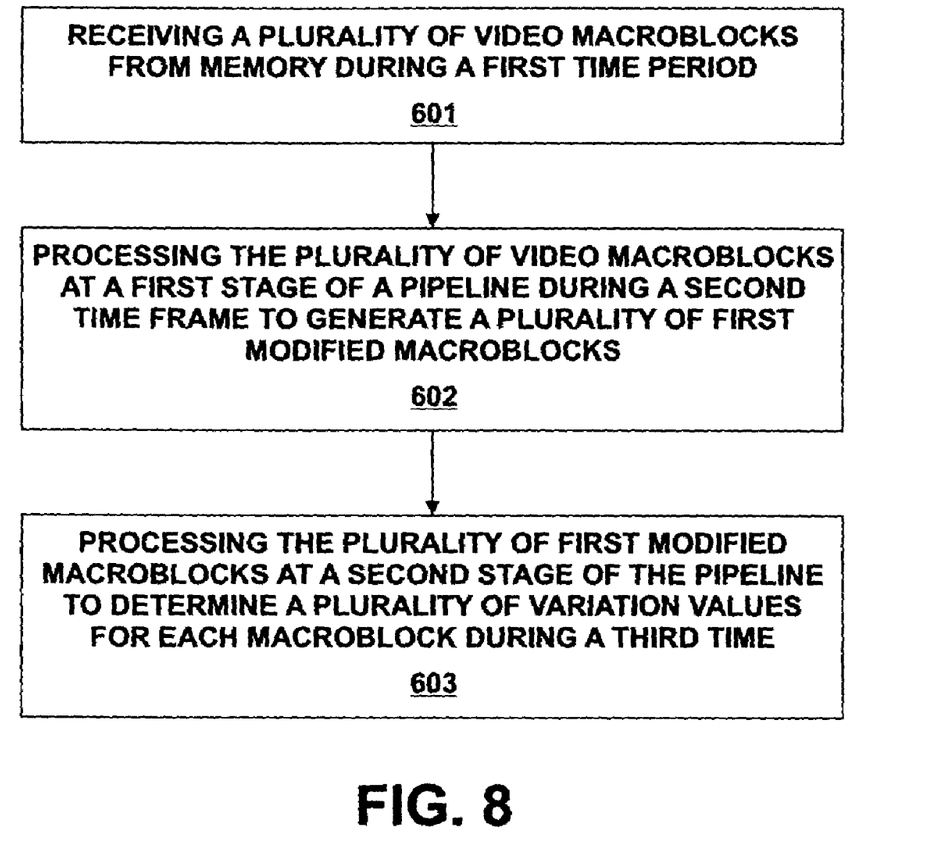

FIG. 8 illustrates another method in accordance with the present disclosure. Specifically, at step 601, a plurality of video macroblocks from memory is received during a first time period.

At step 602, the plurality of video macroblocks is processed at a first stage of a pipeline to generate a plurality of first modified data blocks. For example, the first modified data blocks can be scaled data from a scaler stage or filtered data from a data filter stage of the pipeline.

At step 603, the plurality of first modified macroblocks is processed at a second stage of the pipeline to determine a plurality of variance values for each macroblock during a third time period.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical and electrical changes may be made without departing from the spirit or scope of the invention. In addition, it will be appreciated that the functional blocks shown in the figures could be further combined or divided in a number of manners without departing from the spirit or scope of the invention. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   receiving, at a video pipeline, a first set of data representing a first portion of a video picture to be compressed, the first portion of the video picture comprising a plurality of fields, the plurality of fields comprising odd fields and even fields;
   determining, using the video pipeline, a first variation value representative of a statistical variance of the odd fields;
   determining, using the video pipeline, a second variation value representative of a statistical variance of the even fields;
   determining, using the video pipeline, a third variation value representative of a statistical variance of the plurality of fields; and
   determining, using the video pipeline, a discrete cosine transform (DCT) type to be used for encoding the first set of data based upon the minimum variation value of the first variation value, the second variation value, and the third variation value.

2. The method of claim 1 wherein determining the DCT type comprises:
   determining the DCT type as a frame DCT type responsive to the minimum variation value comprising the third variation value; and
   determining the DCT type as a field DCT type responsive to the minimum variation value comprising one of the first variation value or the second variation value.

3. The method of claim 1, further comprising:
   providing at least one variation value to be stored in memory, the at least one variation value based on at least one of the first variation value, the second variation value, or the third variation value.

4. The method of claim 1, further comprising: providing an indicator of the DCT type to be stored in memory.

5. The method of claim 4, wherein the indicator of the DCT type and the at least one variation value are stored simultaneously.

6. The method of claim 4, wherein the indicator of the DCT type and the one variation value are stored in a common data word.

7. The method of claim 1, wherein receiving the first set of data comprises receiving the first set of data at a first stage of a pipeline from a second stage of the pipeline.

8. The method of claim 7, wherein the second stage of the pipeline comprises a video scaler.

9. The method of claim 7, wherein the second stage of the pipeline comprises a noise reduction filter.

10. The method of claim 7 further comprising identifying the second stage of the pipeline as one of a third stage of the pipeline and a fourth stage of the pipeline.

11. The method of claim 10, wherein identifying the second stage further comprises reading a value from a memory location to identify the second stage.

12. The method of claim 1, further comprising:
    compressing the first set of data at a video compressor based upon the DCT type to generate a second set of data.

13. The method of claim 1, wherein determining the first variation value, the second variation value, and the third variation value comprises determining the first variation value, the second variation value, and the third variation value using a variation calculator integrated circuit of the video pipeline.

14. The method of claim 13, wherein the variation calculator integrated circuit comprises:
    a first circuit path comprising an input to receive a pixel value and an output to provide a first result value, the first circuit path comprising a first latch to latch the pixel value, a squaring portion to provide a first value that is the square of the pixel value, a second latch to latch the first value, a first sum portion to sum the latched value and a latched third value of a third latch, and the third latch to latch an output of the first sum portion as the latched third value; and
    a second circuit path comprising an input to receive the pixel value and an output to provide a second result value, the second circuit patch comprising a fourth latch to latch the pixel value, a sum portion to sum the pixel value and a latched fourth value of a fifth latch, and the fifth latch to latch an output of the first sum portion.

15. A method comprising:
    receiving a plurality of video macroblocks from memory during a first time period;
    processing the plurality of video macroblocks at a first stage of a pipeline during a second time frame to generate a plurality of modified macroblocks, each modified macroblock comprising a plurality of fields, the plurality of fields comprising odd fields and even fields;
    processing the plurality of modified macroblocks at a second stage of the pipeline during a third time to determine a plurality of variation values for each macroblock, the plurality of variation values comprising a first variation value representative of a statistical variance of the odd fields of the macroblock, a second variation value representative of a statistical variance of the even fields of the macroblock, and a third variation value representative of a statistical variance of the plurality of fields of the macroblock.

16. The method of claim 15, wherein processing the plurality of video macroblocks at the first stage of the pipeline operates on N macroblocks, wherein N is a positive integer greater than 1.

17. The method of claim 15, wherein processing the plurality of modified macroblocks at the second stage of the pipeline during the third time to determine the plurality of variation values for each macroblock comprises determining the plurality of variation values using a variation calculator integrated circuit of the second stage.

18. The method of claim 17, wherein the variation calculator integrated circuit comprises:
a first circuit path comprising an input to receive a pixel value and an output to provide a first result value, the first circuit path comprising a first latch to latch the pixel value, a squaring portion to provide a first value that is the square of the pixel value, a second latch to latch the first value, a first sum portion to sum the latched value and a latched third value of a third latch, and the third latch to latch an output of the first sum portion as the latched third value; and
a second circuit path comprising an input to receive the pixel value and an output to provide a second result value, the second circuit patch comprising a fourth latch to latch the pixel value, a sum portion to sum the pixel value and a latched fourth value of a fifth latch, and the fifth latch to latch an output of the first sum portion.

19. A system comprising:
a first stage of a pipeline comprising an input to receive a first set of data representing a portion of a video picture and an output to provide a second set of data representing the portion of the video picture based upon the first set of data;
a second stage of the pipeline comprising an input coupled to the output of the first stage to receive the second set of data, and an output, the second stage of the pipeline comprising:
a first portion to determine one or more field variation values of the second set of data; and
a second portion to determine one or more frame variation values of the second set of data; and
a memory comprising an output to provide a third set of data representing the portion of the video picture to the pipeline, wherein the first set of data is one of the same as the third set of data or a representation of the third set of data.

20. The system of claim 19 wherein the output of the first stage is coupled to the memory to provide the second set of data to an input of the memory.

21. A system comprising:
a first stage of a pipeline comprising an input to receive a first set of data representing a portion of a video picture and an output to provide a second set of data representing the portion of the video picture based upon the first set of data; and
a second stage of the pipeline comprising an input coupled to the output of the first stage to receive the second set of data, and an output, the second stage of the pipeline comprising:
a first portion to determine a plurality of field variation values based on the second set of data;
a second portion to determine a plurality of frame variation values based on the second set of data; and
a third portion coupled to the first module and to the second module to receive variance values, and to provide an indicator to control compression of the second set of data.

22. A system comprising:
a video pipeline to:
receive a first set of data representing a first portion of a video picture to be compressed, the first portion of the video picture comprising a plurality of fields, the plurality of fields comprising odd fields and even fields;
determine a first variation value representative of a statistical variance of the odd fields;
determine a second variation value representative of a statistical variance of the even fields;
determine a third variation value representative of a statistical variance of the plurality of fields; and
determining a discrete cosine transform (DCT) type to be used for encoding the first set of data based upon the minimum variation value of the first variation value, the second variation value, and the third variation value.

23. The system of claim 22, further comprising:
a video compressor to compress the first set of data based upon the DCT type to generate a second set of data.

24. The system of claim 22, wherein the video pipeline comprises variation calculator integrated circuit to determine the first variation value, the second variation value, and the third variation value, the variation calculator integrated circuit comprising:
a first circuit path comprising an input to receive a pixel value and an output to provide a first result value, the first circuit path comprising a first latch to latch the pixel value, a squaring portion to provide a first value that is the square of the pixel value, a second latch to latch the first value, a first sum portion to sum the latched value and a latched third value of a third latch, and the third latch to latch an output of the first sum portion as the latched third value; and
a second circuit path comprising an input to receive the pixel value and an output to provide a second result value, the second circuit patch comprising a fourth latch to latch the pixel value, a sum portion to sum the pixel value and a latched fourth value of a fifth latch, and the fifth latch to latch an output of the first sum portion.

* * * * *